United States Patent
Lu et al.

(10) Patent No.: US 12,512,207 B2
(45) Date of Patent: Dec. 30, 2025

(54) IMAGE TRANSMISSION METHOD AND IMAGE RECEIVING APPARATUS

(71) Applicant: Wistron Corporation, New Taipei (TW)

(72) Inventors: Bo-Li Lu, New Taipei (TW); Hong-Wei Liao, New Taipei (TW); Chia-Hsien Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 428 days.

(21) Appl. No.: 18/182,380

(22) Filed: Mar. 13, 2023

(65) Prior Publication Data
US 2024/0194324 A1  Jun. 13, 2024

(30) Foreign Application Priority Data
Dec. 8, 2022  (TW) .................................. 111147087

(51) Int. Cl.
*G16H 30/20* (2018.01)
*H04N 1/00* (2006.01)

(52) U.S. Cl.
CPC ......... *G16H 30/20* (2018.01); *H04N 1/00095* (2013.01)

(58) Field of Classification Search
CPC ...... G06T 1/0007; G16H 30/20; G16H 30/40; G16H 40/20; G16H 40/67; G16H 50/20; H04L 63/0414; H04L 63/0428; H04L 67/02; H04L 67/06; H04L 67/1095; H04L 67/1097; H04L 67/12; H04N 1/00095
See application file for complete search history.

(56) References Cited

U.S. PATENT DOCUMENTS

| | | | |
|---|---|---|---|
| 9,654,528 B1* | 5/2017 | Cho | H04N 21/2402 |
| 10,958,702 B1* | 3/2021 | Yang | H04L 65/752 |
| 2002/0194325 A1* | 12/2002 | Chmaytelli | H04L 67/34 709/224 |
| 2003/0074379 A1* | 4/2003 | Keohane | H04L 69/329 |
| 2011/0161056 A1* | 6/2011 | Mueller | B29C 64/165 382/128 |
| 2014/0156863 A1* | 6/2014 | Gao | H04L 65/80 709/231 |
| 2015/0113159 A1* | 4/2015 | Gogoi | H04L 67/02 709/231 |
| 2016/0080237 A1* | 3/2016 | Halepovic | H04L 65/752 709/224 |
| 2023/0266991 A1* | 8/2023 | Patel | G06F 9/45558 718/1 |

FOREIGN PATENT DOCUMENTS

| | | | | |
|---|---|---|---|---|
| CN | 111934828 | 12/2021 | | |
| WO | WO-2015198135 A1 * | 12/2015 | | H04L 67/06 |

* cited by examiner

*Primary Examiner* — Christopher Biagini
(74) *Attorney, Agent, or Firm* — JCIPRNET

(57) ABSTRACT

An image transmission method and an image receiving apparatus are provided. In the image transmission method, multiple images are received. A time adjustment weight is determined by a transmission rate of multiple transmitted images among the images, and the transmitted images are received. An estimated transmission time of multiple untransmitted images among the images is determined by the time adjustment weight, and the untransmitted images are not received. Accordingly, it may be automatically determined whether a transmission of the images of a collection have been completed.

18 Claims, 3 Drawing Sheets

IMAGE TRANSMISSION METHOD AND IMAGE RECEIVING APPARATUS

CROSS-REFERENCE TO RELATED APPLICATION

This application claims the priority benefit of Taiwan application serial no. 111147087, filed on Dec. 8, 2022. The entirety of the above-mentioned patent application is hereby incorporated by reference herein and made a part of this specification.

BACKGROUND

Technical Field

The disclosure relates to an image transmission technology, and in particular, to an image transmission method and an image receiving apparatus.

Description of Related Art

Images may come from multiple sources. When the multiple sources are connected in series at the same time, it may not be possible to evaluate whether the image transmission is completed due to the heterogeneity of the source apparatus. For example, different medical instruments may generate different numbers of medical images. When multiple medical instruments continue to generate the medical images, it is impossible to determine the end time of the image transmission and the number of images.

SUMMARY

The embodiments of the disclosure provide an image transmission method and an image receiving apparatus, which may predict the end time of the image transmission according to the previous transmission conditions.

An image transmission method of an embodiment of the disclosure includes (but is not limited to) the following steps. Multiple images are received. A time adjustment weight is determined by a transmission rate of multiple transmitted images among the images, and the transmitted images are received. An estimated transmission time of multiple untransmitted images among the images is determined by the time adjustment weight, and the untransmitted images are not received.

An image receiving apparatus of an embodiment of the disclosure includes (but is not limited to) a communication transceiver, a memory, and a processor. The communication transceiver is configured to receive multiple images. The memory is configured to store a program code. The processor is coupled to the memory and the communication transceiver, and is configured to load the program code to determine the time adjustment weight by a transmission rate of multiple transmitted images among the images, and determine an estimated transmission time of multiple untransmitted images among the images by the time adjustment weight. The transmitted images are received by the processor through the communication transceiver, and the untransmitted images are not received by the processor through the communication transceiver.

Based on the above, according to the image transmission method and the image receiving apparatus of the embodiment of the disclosure, the estimated transmission time of the subsequent untransmitted image is determined according to the transmission rate of the transmitted images, so as to know whether the image source has completed the image transmission to further trigger the subsequent image processing.

In order to make the above-mentioned features and advantages of the disclosure clearer and easier to understand, the following specific embodiments are given and described in details with the accompanying drawings as follows.

DESCRIPTION OF THE EMBODIMENTS

Figure 1:
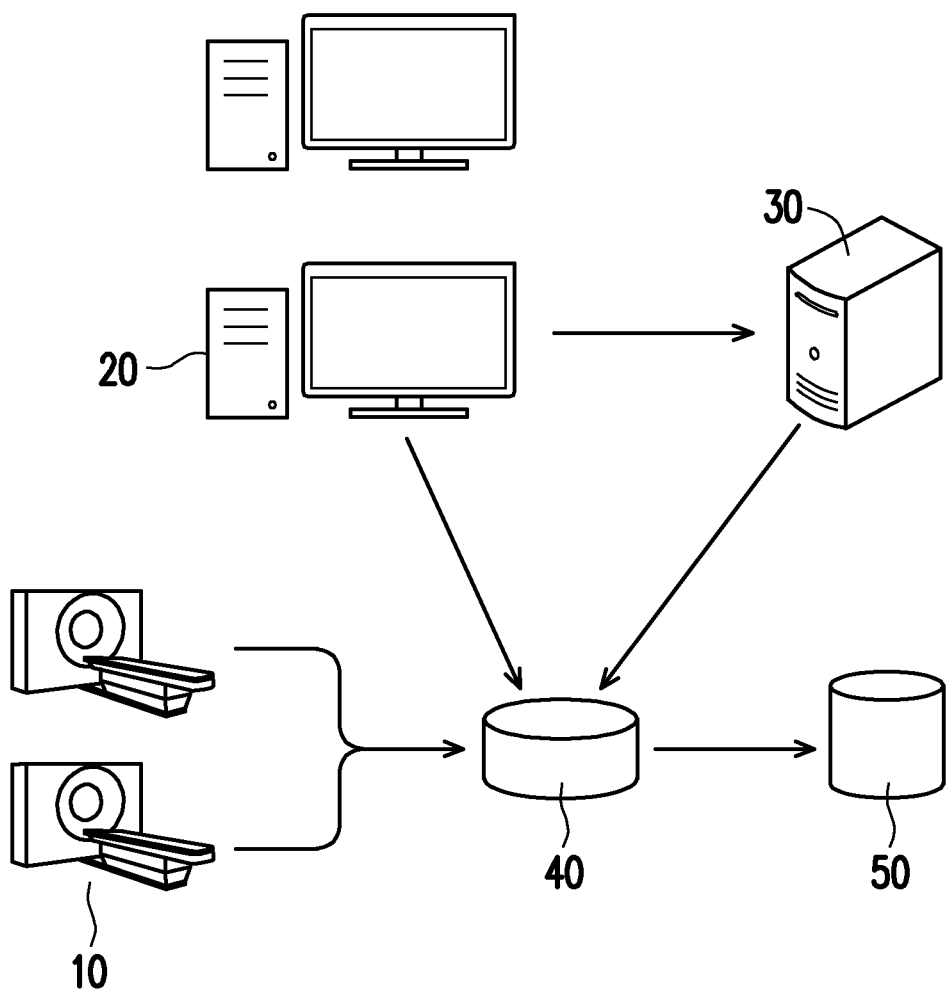
FIG. 1 is a structural diagram of an image working system according to an embodiment of the disclosure.

FIG. 1 is a structural diagram of an image working system 1 according to an embodiment of the disclosure. Referring to FIG. 1, the image working system 1 includes (but is not limited to) one or more image source apparatuses 10, one or more terminal apparatuses 20, an information system 30, an image receiving apparatus 40, and a picture archiving and communication system (PACS) 50.

The image source apparatus 10 may be a photography apparatus used to generate a medical image, an environment image, a traffic image, or a working image. The medical image, for example, may be a computed tomography equipment, an ultrasound scanning equipment, an electrocardiogram detector, or a magnetic resonance imaging (MRI) equipment. In an embodiment, the image source apparatus 10 is configured to generate the images.

The terminal apparatus 20 may be a desktop computer, a notebook computer, a mobile phone, a tablet computer, a smart assistant apparatus, a wearable apparatus, or a server. In an embodiment, the terminal apparatus 20 provides the user interface for the personnel to operate and access and/or view data of the information system 30 and/or the image receiving apparatus 40.

The information system 30 may be a database of various types of information. For example, a healthcare information system (HIS) may record all medical order data in a hospital. For example, medical action data contained in medical orders, diagnoses, hospital admissions, or deaths are collectively referred to as "medical orders." In another example, the radiological information system (RIS) may record patient data in a radiology department.

The image receiving apparatus 40 may be a desktop computer, a notebook computer, a mobile phone, a tablet computer, or a server.

Figure 2:
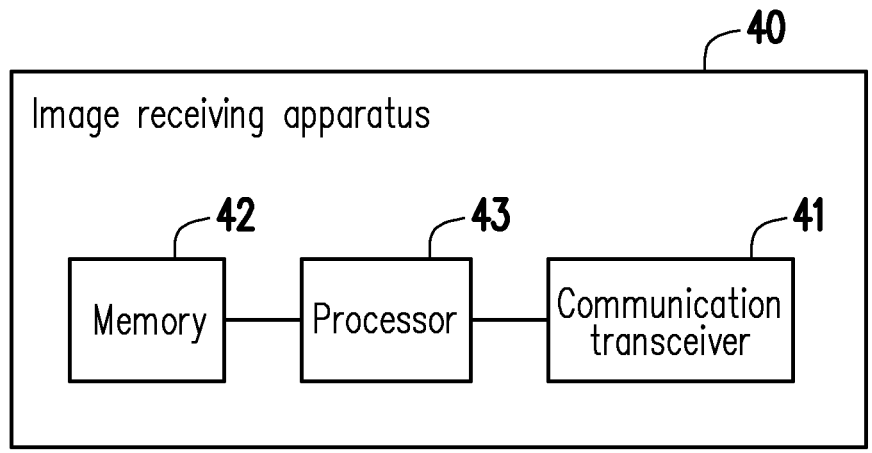
FIG. 2 is a component block diagram of an image receiving apparatus according to an embodiment of the disclosure.

FIG. 2 is a component block diagram of an image receiving apparatus 40 according to an embodiment of the disclosure. The image receiving apparatus 40 includes (but is not limited to) a communication transceiver 41, a memory 42, and a processor 43.

The communication transceiver 41 may support fourth generation (4G) or other generations of mobile communication, Wi-Fi, Bluetooth, infrared, radio frequency identification (RFID), Ethernet, a communication transceiver such as a fiber optic network, serial communication interface (such as RS-232), or other communication transmission interfaces such as Universal Serial Bus (USB) or Thunderbolt. In the embodiment of the disclosure, the communication transceiver 41 is configured to transmit or receive data with other electronic apparatuses (e.g., the image source apparatus 10, the terminal apparatus 20, the information system 30, or the PACS 50).

The memory 42 may be any type of a fixed or removable random access memory (RAM), a read only memory (ROM), a flash memory, a traditional hard disk drive (HDD), a solid-state drive (SSD), or similar components. In an embodiment, the memory 42 is configured to store the program code, the software module, the configuration, the data, or the file (e.g., the image, the value, or the parameter), which will be described in detail in subsequent embodiments.

The processor 43 is coupled to the communication transceiver 41 and the memory 42. The processor 43 may be a central processing unit (CPU), a graphic processing unit (GPU), or other programmable general-purpose or special-purpose microprocessors, a digital signal processor (DSP), a programmable controller, a field programmable gate array (FPGA), an application-specific integrated circuit (ASIC), a neural network accelerator, other similar components, or combinations of the above components. In an embodiment, the processor 43 is configured to execute all or part of the operations of the image receiving apparatus 40, and may load and execute the various program codes, the software modules, the files, and the data stored in the memory 42. In some embodiments, some operations in the method of the embodiment of the disclosure may be implemented by different processors 43 or the same processor 43. In an embodiment, the processor 43 may also execute all or part of the functions of the PACS.

The PACS 50 is a computer or network system specially configured to store, obtain, transmit and/or display the (medical) image.

In an embodiment, the distance between the adjacent images in the medical image is less than five millimeters. The adjacent images may be the adjacent slices. The medical image having the distance between the adjacent images of not less than five millimeters may be provided to the PACS 50. That is, the fine-cut image is sent to the image receiving apparatus 40, and the rough-cut image is sent to the PACS 50. However, the distance between the two images may still be adjusted according to the requirement.

In an embodiment, the image working system 1 further includes an analysis apparatus (not shown). The analysis apparatus is configured to detect or evaluate the image content.

In the following, the method described in the embodiment of the disclosure will be described in combination with the various apparatuses, components, and modules in the image working system 1. Each process of the method may be adjusted accordingly based on the implementation situation, and is not limited thereto.

It is worth noting that the existing medical photography apparatus is equipped with a dedicated PACS. If the PCAS is connected in series to the different types of photography apparatuses at the same time, the system may not be able to know the transmission time of the image, which will affect subsequent operations. For example, if the image is indexed before the image is fully obtained, the analysis apparatus may process the incomplete image. In another example, part of the viewed image may be missing. Therefore, there is a need to propose a corresponding mechanism to solve the aforementioned problems.

Figure 3:
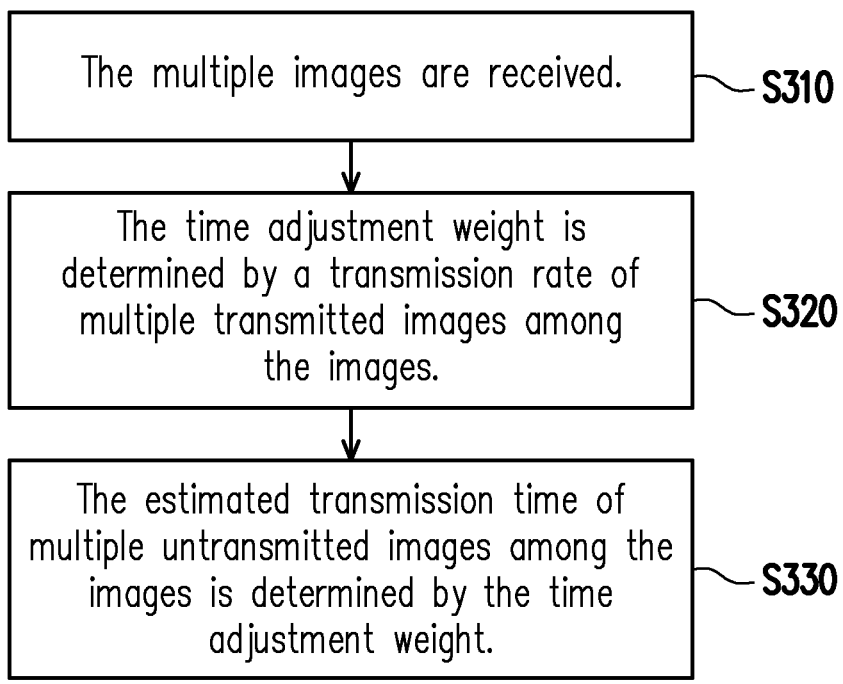
FIG. 3 is a flow diagram of an image transmission method according to an embodiment of the disclosure.

FIG. 3 is a flow diagram of an image transmission method according to an embodiment of the disclosure. Referring to FIG. 3, the processor 43 receives the multiple images through the communication transceiver 41 (step S310). Specifically, the images may come from the image source apparatus 10, other image capturing apparatuses or image sources. According to different application scenarios, the image may be a medical image, a work image, an environment image, or a road image, but is not limited thereto.

In an embodiment, the image belongs to the digital imaging and communications in medicine (DICOM) protocol. The DICOM is a common set of standard protocols used for the processing, storage, printing, and/or transmission of the medical image. The DICOM includes the definition of the file format and the network communication protocol. For example, the DICOM is an application protocol based on the transmission control protocol (TCP)/Internet Protocol (IP), and communicates with various systems through the TCP/IP. Two medical equipment that may accept the DICOM format may receive and/or exchange images and patient data through the DICOM format files.

Figure 4:
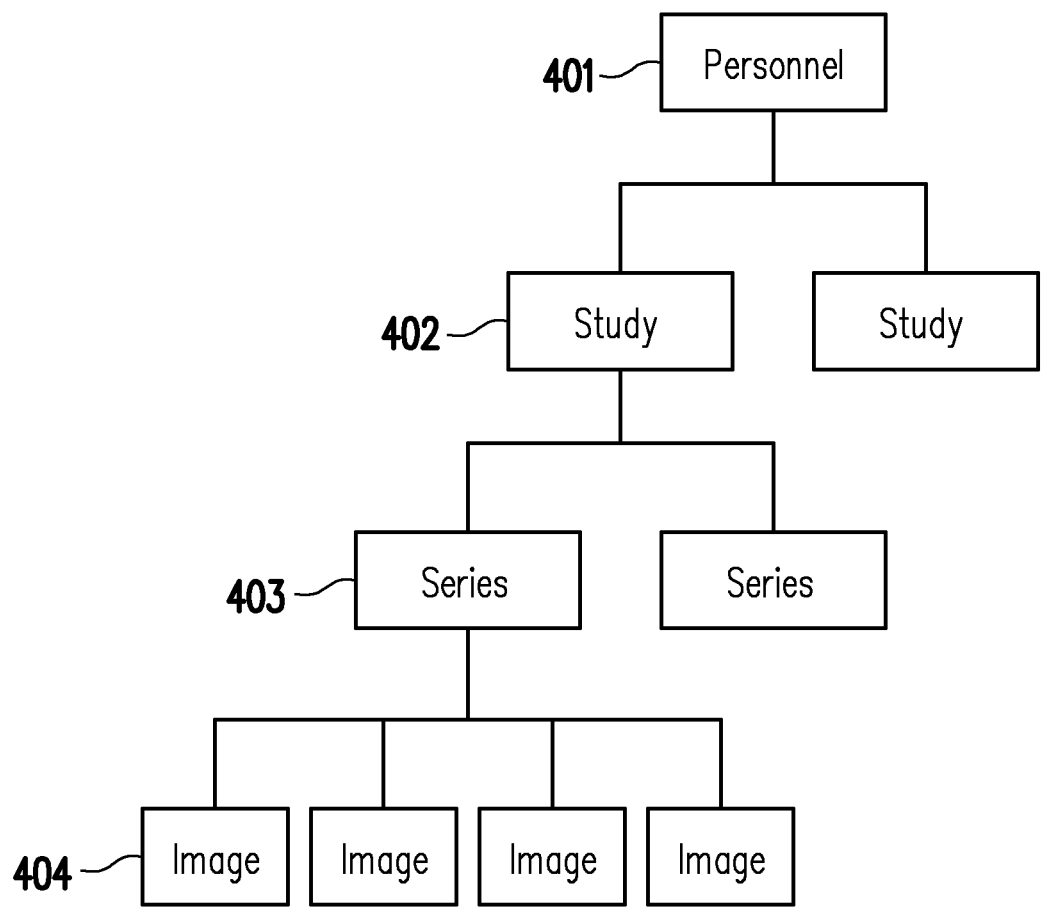
FIG. 4 is a hierarchy schematic diagram of a digital imaging and communications in medicine (DICOM) protocol according to an embodiment of the disclosure.

FIG. 4 is a hierarchy schematic diagram of a digital imaging and communications in medicine (DICOM) protocol according to an embodiment of the disclosure. Referring to FIG. 4, the data structure of the DICOM is divided into four levels: a personnel (or patient) 401, a study (which may be regarded as an image collection) 402, a series 403, and an image 404. The personnel 401 may include all basic information of the patient. The study 402 located at the lower level of the personnel 401 is used for indicating the type of the inspection equipment, for example, a MR (magnetic resonance) or a CT (computed tomography). Each of the series located at the lower level of the study 402 may have one or more images 404. When the doctor needs to read the image 404, the doctor only needs to input the relevant data of the patient to find out the examinations done by the patient according to the data structure and obtains the relevant medical images accordingly.

However, the format of the image is not limited to the DICOM, and may be other image formats.

Referring to FIG. 3, the processor 43 determines the time adjustment weight by the transmission rate of the multiple transmitted images among the images (step S320). Specifically, the processor 43 has received the transmitted images through the communication transceiver 41. The transmitted images "received" may mean that the communication transceiver 41 has acquired the complete image, or that the complete image is further stored/written into the memory 42. In general, the transmission rate is related to the transmission time. For example, a network access speed, a hard disk access speed, an image size, a number of images, or other factors may affect the transmission rate. Therefore, the transmission rate may be used to estimate the transmission completion time of the subsequent image. In addition, the time adjustment weight is a weight for adjusting the estimated transmission time.

In an embodiment, the processor 43 may determine the current adjustment weight by the transmission rate of the transmitted images and the reference transmission time. The transmission rate of the transmitted image may be the time interval from the time point when the first image of the current collection is received (e.g., is written into the memory 42 or is completely received by the communication transceiver 41) to the time point when the last image is received divided by the number of images from the second image to the last image. That is, it is the average transmission rate, and the mathematical expression thereof is as follows:

$$tmpStudyAvgMinRate = (tmpStudyEndTime - tmpStudyStartTime)/(tmpStudyFileCount - 1) \quad (1)$$

where tmpStudyAvgMinRate is the transmission rate, tmpStudyEndTime is the time point when the last image of a collection is received, tmpStudyStartTime is the time point when the first image of the same collection is received, and tmpStudyFileCount is the number of the image in the collection. However, a median, a mode, or other statistical values may also be used for the transmission rate. The foregoing collection may be a DICOM study or other image collections. The reference transmission time is a preset transmission time for transmitting the images of a collection, for example, 60, 100 or 120 minutes. When the preset transmission time is over, the processor 43 may determine that the transmission is over if no more images of the same collection are received.

For example, the current adjustment weight is the value obtained by dividing the transmission rate of the transmitted image by the reference transmission time and optionally adding a preset weight, and the mathematical expression thereof is as follows:

$$tempBaseValueRate = (tmpStudyAvgMinRate/defaultEndMinTime) + 0.1 \quad (2)$$

where tempBaseValueRate is the current adjustment weight, tmpStudyAvgMinRate is the transmission rate, defaultEndMinTime is the reference transmission time, and 0.1 is the preset weight (but may not be limited to 0.1).

Next, the processor 43 may determine the time adjustment weight by the current adjustment weight. In an embodiment, the processor 43 may determine the file proportion of the number of files of the transmitted images of the current collection in the number of statistical files. The current collection refers to the collection of the currently transmitting images. The number of statistical files is a statistical value (for example, an average, a median, or a mode) of the number of files in the multiple collections, and the collections include the previous collection and the current collection. The previous collection is a collection that has completed the transmission prior to the current collection. However, if the current collection is the first collection, that is, there is no collection that has completed the transmission prior to the current collection, the collection does not include the previous collection.

The file proportion may be used to evaluate whether the transmission of the images of the current collection is about to be completed. For example, the file proportion is the value obtained by dividing the number of files of the transmitted images of the current collection by the number of statistical files, and the mathematical expression thereof is:

$$mpProportion = tmpStudyFileCount/studyAvgFileCount \quad (3)$$

where mpProportion is the file proportion, tmpStudyFileCount is the number of files of the transmitted images of the current collection, and studyAvgFileCount is the number of statistical files.

The processor 43 may determine the time adjustment weight by the file proportion and the current adjustment weight. In an embodiment, the time adjustment weight is closer to the reference adjustment weight than the current adjustment weight, in response to the file proportion being smaller. The reference adjustment weight is related to the accumulated previous collections. Accumulated means is stored in memory 42. If the file proportion is smaller, it means that the images of the current collection have just started to be transmitted, and the time adjustment weight needs to refer to the reference adjustment weight related to the previous collection.

In addition, the time adjustment weight is closer to the current adjustment weight than the reference adjustment weight in response to the file proportion being larger. If the file proportion is larger, it means that the transmission of all images in the current collection may be completed soon, and the time adjustment weight needs to refer to the current adjustment weight related to the current collection.

In an embodiment, the processor 43 may perform a weighting operation on the current adjustment weight and the reference adjustment weight by the file proportion. For example, the weighting operation includes a first weight corresponding to the current adjustment weight and a second weight corresponding to the reference adjustment weight. The weighting operation includes the product of the current adjustment weight and the first weight plus the product of the reference adjustment weight and the second weight.

The processor 43 may determine the time adjustment weight by the result of the weighting operation. For example, the time adjustment weight is the sum of the product of the current adjustment weight and the first weight, the product of the second weight, and the base proportion. The base proportion is, for example, 0.1, 0.05, or 0.15, and is not limited thereto.

In an embodiment, the processor 43 may determine that the file proportion corresponds to the reference proportion. The reference proportion is used for quantifying the file proportion. The processor 43 may determine that the first weight is the reference proportion, and the sum of the first weight, the second weight, and the base proportion is 1 (but may not be limited thereto).

For example, when the file proportion is less than 0.1, it means that the number of images in the current collection is not enough, and the reference proportion is zero, so the reference adjustment weight in the record is made to be the time adjustment weight:

$$tmpEndTimeRate = (tempBaseValueRate*0) + (baseValueRate*0.9) + 0.1 \quad (4)$$

where tmpEndTimeRate is the time adjustment weight, tempBaseValueRate is the current adjustment weight, and baseValueRate is the reference adjustment weight. At this time, the first weight is zero, and the second weight is 0.9. Therefore, the sum of the first weight, the second weight, and the base proportion is 1.

When the file proportion is between 0.1 and 0.3, it means that some images of the current collection are accumulated, so the time adjustment weight may be adjusted, but the second weight corresponding to the reference adjustment weight is higher:

$$tmpEndTimeRate = (tempBaseValueRate*0.3) + (baseValueRate*0.6) + 0.1 \quad (5)$$

At this time, the first weight is 0.3, and the second weight is 0.6.

When the file proportion is between 0.3 and 0.7, it means that most of the images of the current collection are accumulated, so the first weight may be close to the second weight:

$$tmpEndTimeRate = (tempBaseValueRate*0.4) + (baseValueRate*0.5) + 0.1 \quad (6)$$

At this time, the first weight is 0.4, and the second weight is 0.5.

When the file proportion is between 0.7 and 1.5, it means that the images of the current collection may be written/received at any time, so the first weight corresponding to the current adjustment weight is higher:

$$\text{tmpEndTimeRate} = (\text{tempBaseValueRate} * 0.6) + (\text{baseValueRate} * 0.3) + 0.1 \quad (7)$$

At this time, the first weight is 0.6, and the second weight is 0.3.

When the file proportion is greater than 1.5, it means that the number of images with the current weight has exceeded the original prediction, so the first weight corresponding to the current adjustment weight is higher, and the second weight corresponding to the reference adjustment weight may be reduced:

$$\text{tmpEndTimeRate} = (\text{tempBaseValueRate} * 0.8) + (\text{baseValueRate} * 0.1) + 0.1 \quad (8)$$

In addition, assuming that the transmission of the first image of the current collection has just started, the processor 43 may reset the time adjustment weight to an initial value (for example, 1 or 0.95) or the reference adjustment weight.

In an embodiment, the processor 43 may determine the reference adjustment weight by the number of one or more completed collections received and the current adjustment weight, in response to the transmitted images of the previous collection being received. A completed collection means that the collection or the collections have completed the transmission. The completed collections may include the previous collection. For example, the mathematical expression for the reference adjustment weights is as follows:

$$\text{baseValueRate} = ((\text{baseValueRate} * \text{studyCount}) + \text{tempBaseValueRate}) / (\text{studyCount} + 1) \quad (9)$$

where studyCount is the number of completed collections.

On the other hand, the processor 43 may reset the reference adjustment weight to an initial value, in response to the transmitted images of the previous collection not being received. The initial value is, for example, 1 or 0.95. Since the reference adjustment weight is related to the accumulated previous collections (i.e., the completed set), the initial value may be used as the reference adjustment weight if there is not yet a completed collection.

Referring to FIG. 3, the processor 43 determines the estimated transmission time of the multiple untransmitted images among the images by the time adjustment weight (step S330). Specifically, the processor 43 has not yet received the untransmitted images through the communication transceiver 41. The untransmitted images "not yet received" may mean that the communication transceiver 41 has not yet obtained a complete image, or that the complete image is not stored/written into the memory 42.

In an embodiment, the estimated transmission time is obtained by adjusting the reference transmission time through the time adjustment weight. For example, the estimated transmission time is the product of the reference transmission time and the time adjustment weight. In other embodiments, the estimated transmission time may also be other mathematical calculations or comparison relationships based on the time adjustment weight and the reference transmission time. Therefore, the mathematical expression for the estimated transmission completion time of the current collection is:

$$\text{tmpStudyStartTime} + (\text{defaultEndMinTime} * \text{tmpEndTimeRate}) \quad (10)$$

where NewlyTransmissionTime is the time point of the currently transmitted image of the current collection.

In order to help readers understand the spirit of the disclosure, here are a few more descriptions of the application scenarios:

The first scenario is that the first image starts to be transmitted to the image receiving apparatus 40. Therefore, no information is accumulated. That is, there is no completed collection or previous collection. The reference adjustment weight is the initial value baseValueRate=1. The number of collections is studyCount=0. The average number of study files (that is, the number of statistical files) is studyAvgFileCount=0. The writing of the first image of the current study is completed at 06:45, and the writing of the last image is completed at 07:30.

Therefore, the expected end time is defaultEndMinTime*baseValueRate=120 (minutes). That is, it is estimated that the writing of the file may be completed at 09:30. At this point, the total number of files in the study is 125 images and tmpStudyFileCount=125. The average transmission rate of the study is tmpStudyAvgMinRate=(07:30-06:45)/(125-1)=0.363. The current adjustment weight of the study is tempBaseValueRate=(0.363/120)+0.1=0.103. The reference adjustment weight is baseValueRate= ((baseValueRate*studyCount)+tempBaseValueRate)/ (studyCount+1)=((1*0)+0.103)/(0+1)=0.103.

The second scenario is that the image receiving apparatus 40 has the completed collection or the previous collection. After accepting the first situation, the second study is transmitted to the image receiving apparatus 40. The reference adjustment weight is baseValueRate=0.103. The number of collections is studyCount=1. The average number of study files is studyAvgFileCount=125. The writing of the first image of the current study is completed at 08:12.

Therefore, the current adjustment weight of the study is tempBaseValueRate=0. The file proportion is 1/125=0.008. The time adjustment weight is tmpEndTimeRate= (0.103*0.9)+0.1=0.192. If there is no further writing of the subsequent image, the estimated end time is 08:12+ (120*0.192)=08:35.

The third scenario is that the writing of the tenth image is completed at 08:16. The average transmission rate of the current study is tmpStudyAvgMinRate=(08:16−08:12)/(10−1)=0.44.

Therefore, the reference adjustment weight of the current study is tempBaseValueRate=(0.44/120)+0.1=0.104. The file proportion is 10/125=0.08. The time adjustment weight is tmpEndTimeRate=(0.103*0.9)+0.1=0.192. If there is no further writing of the subsequent image, the estimated end time is 08:16+(120*0.192)=08:39.

The fourth scenario is that the writing of the fifteenth image is completed at 08:25. The average transmission rate of the current study is tmpStudyAvgMinRate=(08:25−08:12)/(15−1)=0.93.

Therefore, the reference adjustment weight of the current study is tempBaseValueRate=(0.93/120)+0.1=0.107. The file proportion is 10/125=0.12. The time adjustment weight is tmpEndTimeRate=(0.107*0.3)+(0.103*0.6)+0.1=0.193. If there is no further writing of the subsequent image, the estimated end time is 08:25+(120*0.192)=08:48.

The fifth case is that the writing of the ninetieth image is completed at 09:20. The average transmission rate of the current study is tmpStudyAvgMinRate=(09:20−08:12)/(90−1)=0.76.

Therefore, the reference adjustment weight of the current study is tempBaseValueRate=(0.76/120)+0.1=0.106. The file proportion is 90/125=0.72. The tmpEndTimeRate=

(0.106*0.6)+(0.103*0.3)+0.1=0.194. If there is no further writing of the subsequent image, the estimated end time is 09:20+(120*0.194)=09:43.

The sixth situation is that the writing of the two-hundredth image is completed at 12:10. The average transmission rate of the current study is tmpStudyAvgMinRate=(11:50−08:12)/(200−1)=1.20.

Therefore, the reference adjustment weight of the current study is tempBaseValueRate=(1.20/120)+0.1=0.11. The file proportion is 200/125=1.6. The time adjustment weight is tmpEndTimeRate=(0.11*0.8)+(0.103*0.1)+0.1=0.198. If there is no further writing of the subsequent image, the estimated end time is 12:10+(120*0.198)=12:34.

The seventh situation is that the current study has no data written after 12:34, and it may be judged that the writing of the study is completed. The number of images in the study is 200, and tmpStudyFileCount=200. The average transmission rate of the current study is tmpStudyAvgMinRate=1.2. The reference adjustment weight of the current study is tempBaseValueRate=0.11. The number of collections is studyCount=2. The average number of accumulated studies (that is, the number of statistical files) is study AvgFileCount=(200+120)/2=160. The reference adjustment weight is baseValueRate=((1*0.103)+0.11)/2=0.106.

To sum up, in the image transmission method and the image receiving apparatus according to the embodiment of the disclosure, the time adjustment weight is determined according to the transmitted images of the previous collection and/or the current collection, and the transmission time of the images is predicted accordingly. In this way, it may be applied to a system with multiple image sources, and also contributes to the successful continuation of the subsequent image processing.

Although the disclosure has been described with reference to the foregoing embodiments, the embodiments are not intended to limit the disclosure. Any person skilled in the art may make some changes and modifications without departing from the spirit and scope of the disclosure. The scope of the disclosure will be defined in the appended claims.

What is claimed is:

1. An image transmission method, comprising:
   receiving a plurality of images of a current collection;
   determining a current adjustment weight based on a transmission rate of a plurality of transmitted images among the images of the current collection, wherein the transmitted images are received;
   determining a file proportion of a number of files of the transmitted images of the current collection in a statistical number of files, wherein the number of the statistical files is a statistical value of the number of the files in a plurality of collections, and the collections comprise a previous collection and the current collection;
   determining a time adjustment weight based on the file proportion and the current adjustment weight;
   determining an estimated transmission time of a plurality of untransmitted images among the images of the current collection based on the time adjustment weight, wherein the untransmitted images are not received, and
   triggering subsequent image processing after determining that the transmission of the plurality of images of the current collection is completed according to the estimated transmission time.

2. The image transmission method according to claim 1, wherein the step of determining the time adjustment weight comprises:
   determining a reference transmission time, wherein the reference transmission time is a preset transmission time for transmitting the plurality of images of the current collection, and the estimated transmission time is obtained by adjusting the reference transmission time through the time adjustment weight.

3. The image transmission method according to claim 2, wherein the images belong to a digital imaging and communications in medicine (DICOM) protocol, and the images of the collection are a study.

4. The image transmission method according to claim 1, wherein the step of determining the time adjustment weight based on the file proportion and the current adjustment weight comprises:
   performing a weighting operation on the current adjustment weight and a reference adjustment weight based on the file proportion; and
   determining the time adjustment weight by a result of the weighting operation.

5. The image transmission method according to claim 4, wherein the weighting operation comprises a first weight corresponding to the current adjustment weight and a second weight corresponding to the reference adjustment weight, and the step of performing the weighting operation on the current adjustment weight and the reference adjustment weight based on the file proportion comprises:
   determining the file proportion for corresponding to a reference proportion, wherein the reference proportion is used for quantifying the file proportion; and
   determining the first weight for being the reference proportion, wherein a sum of the first weight, the second weight, and a base proportion is 1.

6. The image transmission method according to claim 4, further comprising:
   determining the reference adjustment weight by a number of collections of a completed collection and the current adjustment weight, in response to the transmitted images of the previous collection being received, wherein the number of collections of the completed collection are received; and
   resetting the reference adjustment weight to an initial value, in response to the transmitted images of the previous collection not being received.

7. The image transmission method according to claim 1, further comprising:
   the time adjustment weight being closer to a reference adjustment weight, in response to the file proportion being smaller than the current adjustment weight; and
   the time adjustment weight being closer to the current adjustment weight, in response to the file proportion being larger than the reference adjustment weight.

8. The image transmission method according to claim 1, wherein the images are a plurality of medical images.

9. The image transmission method according to claim 8, wherein a distance between two adjacent medical images among the medical images is less than five millimeters.

10. An image receiving apparatus, comprising:
    a communication transceiver, receiving a plurality of images of a current collection;
    a memory, storing a program code;
    a processor, coupled to the communication transceiver and the memory, wherein the processor loads the program code to:
    determine a current adjustment weight based on a transmission rate of a plurality of transmitted images among the images of the current collection, wherein the transmitted images are received by the processor through the communication transceiver;

determine a file proportion of a number of files of the transmitted images of the current collection in a statistical number of files, wherein the number of the statistical files is a statistical value of the number of the files in a plurality of collections, and the collections comprise a previous collection and the current collection;

determine a time adjustment weight based on the file proportion and the current adjustment weight;

determine an estimated transmission time of a plurality of untransmitted images among the images of the current collection based on the time adjustment weight, wherein the untransmitted images are not received by the processor through the communication transceiver, and trigger subsequent image processing after determining that the transmission of the plurality of images of the current collection is completed according to the estimated transmission time.

11. The image receiving apparatus according to claim 10, wherein the processor further:

determines a reference transmission time, wherein the reference transmission time is a preset transmission time for transmitting the plurality of images of the current collection, and the estimated transmission time is obtained by adjusting the reference transmission time through the time adjustment weight.

12. The image receiving apparatus according to claim 11, wherein the images belong to a digital imaging and communications in medicine (DICOM) protocol, and the images of the collection are a study.

13. The image receiving apparatus according to claim 10, wherein the processor further:

performs a weighting operation on the current adjustment weight and a reference adjustment weight based on the file proportion; and determines the time adjustment weight by a result of the weighting operation.

14. The image receiving apparatus according to claim 13, wherein the weighting operation comprises a first weight corresponding to the current adjustment weight and a second weight corresponding to the reference adjustment weight, and the processor further:

determines the file proportion for corresponding to a reference proportion, wherein the reference proportion is used for quantifying the file proportion; and determines the first weight for being the reference proportion, wherein a sum of the first weight, the second weight, and a base proportion is 1.

15. The image receiving apparatus according to claim 13, wherein the processor further:

determines the reference adjustment weight by a number of collections of a completed collection and the current adjustment weight, in response to the transmitted images of the previous collection being received, wherein the number of collections of the completed collection are received; and resets the reference adjustment weight to an initial value, in response to the transmitted images of the previous collection not being received.

16. The image receiving apparatus according to claim 10, wherein the processor further executes:

the time adjustment weight for being closer to a reference adjustment weight, in response to the file proportion being smaller than the current adjustment weight; and the time adjustment weight for being closer to the current adjustment weight, in response to the file proportion being larger than the reference adjustment weight.

17. The image receiving apparatus according to claim 10, wherein the images are a plurality of medical images.

18. The image receiving apparatus according to claim 17, wherein a distance between two adjacent medical images among the medical images is less than five millimeters.

* * * * *